United States Patent
Blum

(10) Patent No.: US 11,706,827 B2
(45) Date of Patent: Jul. 18, 2023

(54) PHYSICAL CONTACT DETECTION FOR DEVICE PAIRING

(71) Applicant: Honeywell International Inc., Charlotte, NC (US)

(72) Inventor: William R. Blum, Huntington Station, NY (US)

(73) Assignee: Honeywell International Inc., Charlotte, NC (US)

( * ) Notice: Subject to any disclaimer, the term of this patent is extended or adjusted under 35 U.S.C. 154(b) by 238 days.

(21) Appl. No.: 17/117,591

(22) Filed: Dec. 10, 2020

(65) Prior Publication Data

US 2021/0092784 A1 Mar. 25, 2021

Related U.S. Application Data

(63) Continuation of application No. 15/978,991, filed on May 14, 2018, now abandoned.

(51) Int. Cl.

| | |
|---|---|
| *H04W 76/14* | (2018.01) |
| *G01P 15/00* | (2006.01) |
| *H04L 9/40* | (2022.01) |
| *H04W 4/80* | (2018.01) |

(52) U.S. Cl.
CPC .......... *H04W 76/14* (2018.02); *G01P 15/001* (2013.01); *H04L 63/0492* (2013.01); *H04W 4/80* (2018.02)

(58) Field of Classification Search
CPC ..... H04W 12/50; H04W 76/14; H04I 63/0492
See application file for complete search history.

(56) References Cited

U.S. PATENT DOCUMENTS

| | | | |
|---|---|---|---|
| 9,593,861 B1 * | 3/2017 | Burnett | ............ F24F 11/30 |
| 2014/0341399 A1 | 11/2014 | Dusse et al. | |
| 2017/0091412 A1 | 3/2017 | Johnson | |
| 2018/0054509 A1 | 2/2018 | Nuescheler et al. | |
| 2018/0132287 A1 | 5/2018 | Cheng et al. | |
| 2019/0261166 A1 | 8/2019 | Rotsaert | |

\* cited by examiner

*Primary Examiner* — Bo Hui A Zhu
(74) *Attorney, Agent, or Firm* — Brooks, Cameron & Huebsch, PLLC

(57) ABSTRACT

Devices, methods, and systems for physical contact detection for device pairing are described herein. One device includes a mechanism configured to detect physical contact between the device and a wireless device, a memory, and a processor configured to execute executable instructions stored in the memory to perform a pairing of the wireless device and the device only upon the mechanism detecting the physical contact between the device and the wireless device.

14 Claims, 2 Drawing Sheets

PHYSICAL CONTACT DETECTION FOR DEVICE PAIRING

PRIORITY INFORMATION

This application is a Continuation of U.S. application Ser. No. 15/978,991 filed May 14, 2018, the contents of which are incorporated herein by reference.

TECHNICAL FIELD

The present disclosure relates generally to devices, methods, and systems for physical contact detection for device pairing.

BACKGROUND

Pairing may refer to and/or include a process used in computer networking to establish an initial link between computing devices that allows for communications between the devices to occur. As an example, in a home energy management system, a mobile (e.g., smart) phone of the home's occupant may be paired with the central thermostat of the home to allow the home's occupant to control the thermostat (e.g., the settings of the thermostat) via the mobile phone.

Such a pairing of computing devices, however, may present increased security risks for the devices, such as, for instance, unauthorized third party listening and/or hacking. These security risks can be reduced and/or eliminated by verifying that the pairing party (e.g., the person attempting to pair the devices) is in physical control (e.g., possession) of both devices (e.g., of both sides of the link).

Previous approaches for verifying a user's physical control of devices to be paired may include, for instance, the user entering a PIN on the display of one or both of the devices, or the user scanning a QR code displayed on one of the devices with a camera of the other device. Such approaches, however, may not provide a uniform user experience, as they may be dependent on the specific features of the devices and/or the specific applications of the devices.

DETAILED DESCRIPTION

Figure 1:
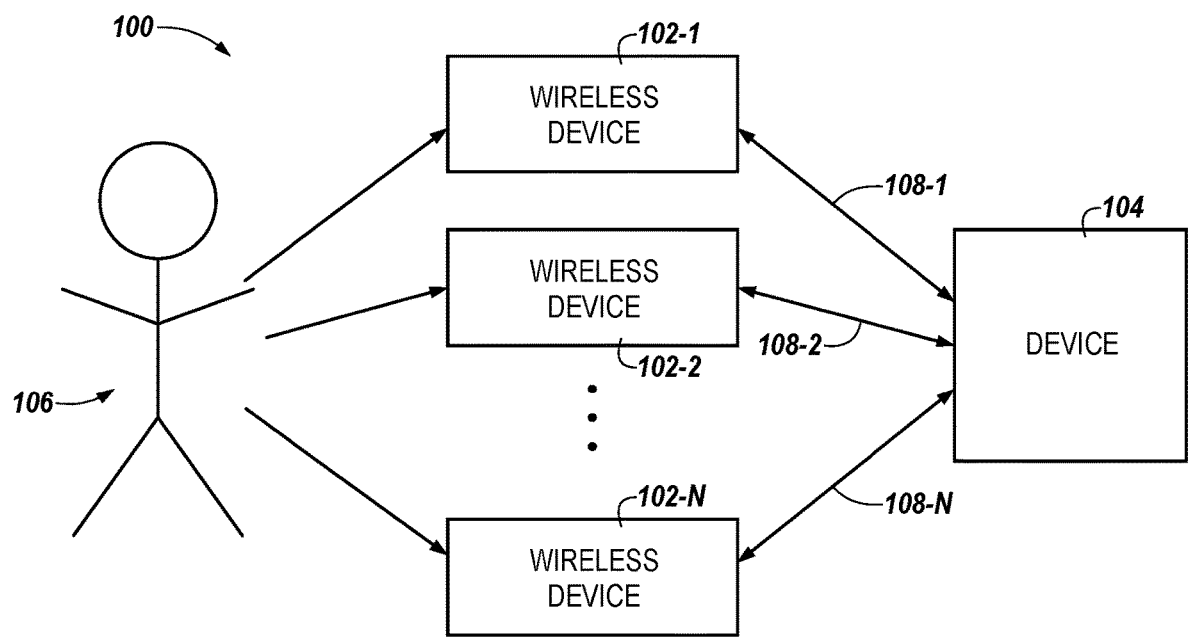
FIG. 1 illustrates an example of a system for physical contact detection for device pairing in accordance with an embodiment of the present disclosure.

Devices, methods, and systems for physical contact detection for device pairing are described herein. For example, an embodiment includes a mechanism configured to detect physical contact between the device and a wireless device, a memory, and a processor configured to execute executable instructions stored in the memory to perform a pairing of the wireless device and the device only upon the mechanism detecting the physical contact between the device and the wireless device.

Embodiments of the present disclosure can be used to reduce and/or eliminate security risks associated with device pairing, such as, for instance, unauthorized third party listening and/or hacking. For example, embodiments of the present disclosure can be used to verify that the pairing party (e.g., the person attempting to pair the devices) is in physical control (e.g., possession) of both devices (e.g., of both sides of the link being established between the devices).

Further, embodiments of the present disclosure can provide a uniform user experience for the pairing party to verify that they are in physical control of both devices. For instance, embodiments of the present disclosure may be capable verifying that the pairing party is in physical control of the devices to be paired independent of the specific features of the devices and the specific applications of the devices, such that the user's experience is a common one across different types of devices to be paired. In contrast, previous approaches for verifying the user's physical control of the devices to be paired (e.g., entering a PIN or scanning a QR code) may not provide a uniform user experience, as they may be dependent on the specific features of the devices and/or the specific applications of the devices, and therefore may vary across different types of devices. As such, utilizing embodiments of the present disclosure to perform the physical control verification can make the device pairing process quicker, simpler, and/or easier for the user as compared to previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2.

As used herein, "a" or "a number of" something can refer to one or more such things, while "a plurality of" something can refer to more than one such things. For example, "a number of devices" can refer to one or more devices, while "a plurality of devices" can refer to more than one device. Additionally, the designator "N" as used herein, particularly with respect to reference numerals in the drawings, indicates that a number of the particular feature so designated can be included with embodiments of the present disclosure.

FIG. 1 illustrates an example of a system 100 for physical contact detection for device pairing in accordance with an embodiment of the present disclosure. In the example illustrated in FIG. 1, system 100 includes a number of wireless devices 102-1, 102-2, . . . , 102-N and a device 104. For instance, in the example illustrated in FIG. 1, wireless devices 102-1, 102-2, . . . , 102-N are being paired with device 104.

As used herein, device pairing may include and/or refer to the process of establishing an initial link between devices that allows for communications between the devices to occur (e.g. over which the devices may communicate). For instance, in the example illustrated in FIG. 1, pairing wireless device 102-1 with device 104 may include establishing wireless link 108-1 with device 104, pairing wireless device 102-2 with device 104 may include establishing a wireless link 108-2 with device 104, and pairing wireless device 102-N with device 104 may include establishing wireless link 108-N with device 104. The devices may be paired, for example, during installation and/or setup of device 104 and/or wireless devices 102-1, 102-2, . . . , 102-N.

Wireless links 108-1, 108-2, . . . , 108-N can comprise a wireless communication protocol such as, for example, IEEE 802.15.1 (e.g., Bluetooth), IEEE 802.15.4 (e.g., Zig-Bee), IEEE 802.3, IEEE 802.11 (e.g., WiFi), Redlink, or Bluetooth low energy wireless communication protocol, among others. For instance, wireless links 108-1, 108-2, . . . , 108-N can provide a virtual near-field communication (NFC) link between wireless devices 102-1, 102-2, . . . , 102-N and device 104. However, embodiments of the present disclosure are not limited to a particular type(s) of wireless communication protocol.

Device 104 can be, for example, an energy management device. For instance, device 104 can be a home energy management device that can be used to manage and/or control the energy consumption of a home. As an example, device 104 can be a thermostat (e.g., a home thermostat) that can control (e.g. adjust) the operation of the furnace, air conditioner, and/or other energy loads (e.g., other energy consuming devices, systems, appliances, and/or mechanisms) of the home.

Figure 2:
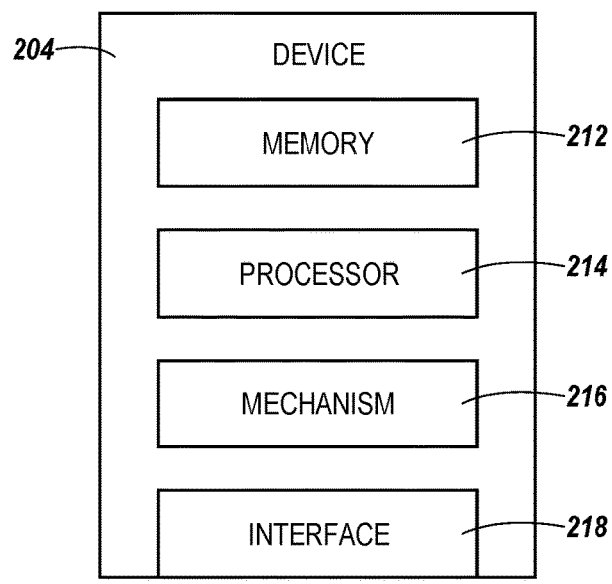
FIG. 2 illustrates an example of a device for pairing with a wireless device in accordance with an embodiment of the present disclosure.

Device 104 will be further described herein (e.g., in connection with FIG. 2). For instance, device 104 can include a mechanism to detect physical contact between device 104 and wireless devices 102-1, 102-2, . . . , 102-N, and an interface to communicate with wireless devices 102-1, 102-2, . . . , 102-N while being paired with wireless devices 102-1, 102-2, . . . , 102-N, as will be further described herein.

Wireless devices 102-1, 102-2, . . . , 102-N can include (e.g., be), for example, mobile devices, such as mobile (e.g., smart) phones and/or tablets. For instance, one or more of wireless devices 102-1, 102-2, . . . , 102-N can be a mobile device(s) of user 106. User 106 can be, for instance, an occupant of the home. Wireless devices 102-1, 102-2, . . . , 102-N can also include, for example, sensors, such as temperature sensors, lighting sensors, and/or humidity sensors. For instance, one or more of wireless devices 102-1, 102-2, . . . , 102-N can be sensors located inside and/or outside of the home.

Device 104 can include a mechanism to detect physical contact between device 104 and wireless devices 102-1, 102-2, . . . , 102-N. For example, during a pairing of (e.g., an attempt to pair) a wireless device 102-1, 102-2, . . . , 102-N with device 104, the mechanism can detect physical contact between device 104 and the wireless device. Examples of the mechanism will be further described herein (e.g. in connection with FIG. 2).

The physical contact between device 104 and the wireless device can include, for instance, a tap of device 104 with the wireless device by user 106. Further, device 104 (e.g., the mechanism of device 104) can detect the physical contact while device 104 is stationary or while device 104 is in motion (e.g., the physical contact between device 104 and the wireless device may occur while device 104 is not moving, or while both device 104 and the wireless device are moving).

By detecting the physical contact between device 104 and the wireless device, device 104 can determine (e.g., verify) that user 106 is in physical control (e.g., possession) of both device 104 and the wireless device during the pairing, and determine whether to perform the device pairing based on this determination. For example, device 104 may perform the paring of the wireless device and device 104 only upon detecting the physical contact between the devices (e.g., only upon determining user 106 is in physical control of both devices); device 104 may prevent the pairing of the wireless device and device 104 in the absence of detecting physical contact between the devices (e.g., upon determining user 106 is not in physical control of both devices).

In some embodiments, wireless devices 102-1, 102-2, . . . , 102-N may also include a mechanism (e.g., an accelerometer or shock detector) to detect the physical contact between the wireless device and device 104. For instance, the wireless device may detect the physical contact at the same time as device 104. In such embodiments, device 104 may perform the paring of the wireless device and device 104 only upon the wireless device and device 104 simultaneously detecting the physical contact between the devices. That is, in such embodiments, the verification that user 106 is in physical control of both devices can be determined (e.g., proven) by the aligned timing of the physical contact detection by both devices.

After the devices have been paired (e.g. after the physical contact between the wireless device and device 104 has been detected and the pairing of the devices has been performed), communications may occur between the devices. For example, in embodiments in which device 104 is a home energy management device (e.g., thermostat) and the wireless device is a mobile (e.g., smart) phone of user 106, user 106 can send instructions for controlling the home energy management device (e.g., instructions to adjust the settings of the thermostat) to the device via the mobile phone. However, embodiments of the present disclosure are not limited to this example.

The subsequent communications that may occur between the devices after the devices have been paired can occur via a wired or wireless network (not shown in FIG. 1 for clarity and so as not to obscure embodiments of the present disclosure). For example, the network can be a network relationship through which device 104 and wireless devices 102-1, 102-2, . . . , 102-N communicate. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

In some embodiments, device 104 (e.g., the mechanism of device 104) may also detect subsequent movement of device 104 after it has been paired with the wireless device (e.g., after the pairing of the devices has been performed). Detection of such subsequent movement of device 104 can, for instance, provide an indication that device 104 has been tampered with and/or moved after it has been installed.

FIG. 2 illustrates an example of a device 204 for pairing with a wireless device in accordance with an embodiment of the present disclosure. Device 204 can be, for example, device 104 previously described in connection with FIG. 1. As shown in FIG. 2, device 204 can include a memory 212, a processor 214, a mechanism 216, and an interface 218.

Mechanism 216 can be used by device 204 to detect physical contact between device 204 and a wireless device (e.g., wireless devices 102-1, 102-2, ..., 102-N previously described in connection with FIG. 1) during a pairing of device 204 with the wireless device, as previously described herein. Mechanism 216 can be, for example, an accelerometer or a shock detector included within device 204. However, embodiments of the present disclosure are not so limited, and can include any type of mechanism capable of detecting physical contact between device 204 and a wireless device.

Interface 218 can be used by device 204 to communicate with a wireless device (e.g., wireless devices 102-1, 102-2, ..., 102-N previously described in connection with FIG. 1) during a pairing of device 204 with the wireless device, as previously described herein. For example, interface 218 may be associated with (e.g., used to establish) a wireless link (e.g. wireless links 108-1, 108-2, ..., 108-N previously described in connection with FIG. 1) comprising a wireless communication protocol for communicating with the wireless device during the device pairing, as previously described herein.

Memory 212 can be any type of storage medium that can be accessed by processor 214 to perform various examples of the present disclosure. For example, memory 212 can be a non-transitory computer readable medium having computer readable instructions (e.g., computer program instructions) stored thereon that are executable by processor 214 to pair device 204 with a wireless device in accordance with the present disclosure. That is, processor 214 can execute the executable instructions stored in memory 212 to pair device 204 with a wireless device in accordance with the present disclosure.

Memory 212 can be volatile or nonvolatile memory. Memory 212 can also be removable (e.g., portable) memory, or non-removable (e.g., internal) memory. For example, memory 212 can be random access memory (RAM) (e.g., dynamic random access memory (DRAM), resistive random access memory (RRAM), and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 212 is illustrated as being located in device 204, embodiments of the present disclosure are not so limited. For example, memory 212 can also be located internal to another computing resource (e.g., enabling computer readable instructions to be downloaded over the Internet or another wired or wireless connection).

Figure 3:
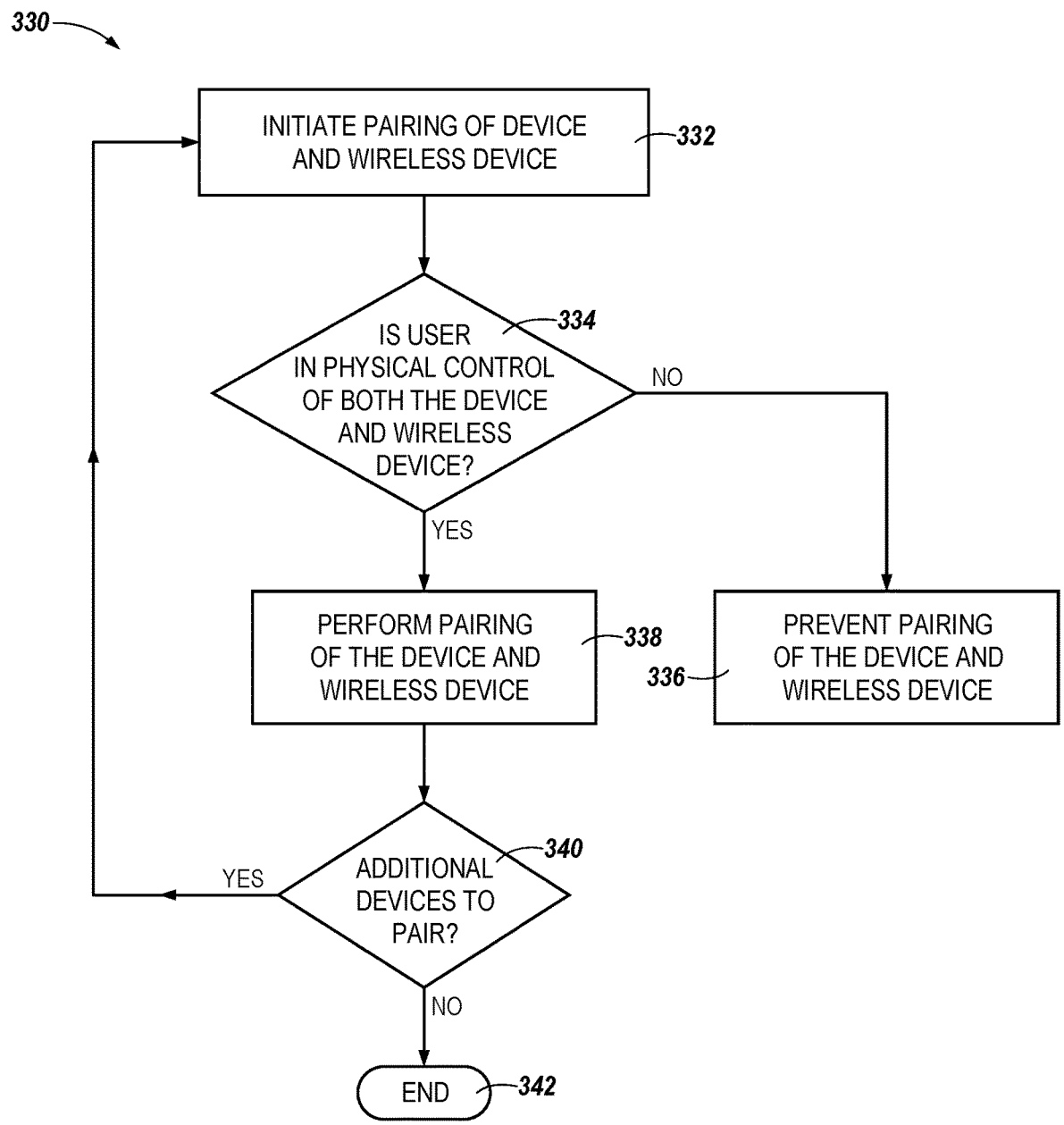
FIG. 3 illustrates an example of a method for physical contact detection for device pairing in accordance with an embodiment of the present disclosure.

FIG. 3 illustrates an example of a method 330 for physical contact detection for device pairing in accordance with an embodiment of the present disclosure. Method 330 can be performed by, for example, device 104 and/or device 204 previously described in connection with FIGS. 1 and 2, respectively.

At block 332, method 330 includes initiating a pairing of a device and a wireless device. The device can be, for example, device 104 and/or device 204 previously described in connection with FIGS. 1 and 2, respectively, and the wireless device can be, for example, a wireless device 102-1, 102-2, ..., 102-N previously described in connection with FIG. 1.

At block 334, method 330 includes determining whether a user is in physical control (e.g., possession) of both the device and the wireless device. This determination can be made, for example, based on whether physical contact is detected between the device and the wireless device is detected, as previously described herein.

If it is determined the user is not in physical control of both the device and the wireless device, the pairing of the device and wireless device is prevented at block 336. If it is determined the user is in physical control of both the device and the wireless device, the pairing of the device and the wireless device is performed at block 338.

After the device and the wireless device have been paired, method 330 includes determining whether there are any additional wireless devices to pair with the device at block 340. If there are no additional wireless devices to pair, method 330 ends at block 342. If there is an additional wireless device to pair, method 330 returns to block 332.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A device, comprising:
    a mechanism configured to detect physical contact between the device and a wireless device, wherein the physical contact includes a tap of the device with the wireless device that is also detected by a mechanism of the wireless device, and wherein the mechanism of the wireless device is an accelerometer or shock detector;
    a memory; and
    a processor configured to execute executable instructions stored in the memory to:
        perform a pairing of the wireless device and the device only upon the mechanism of the device and the mechanism of the wireless device simultaneously detecting the physical contact between the device and the wireless device; and
        receive, after the pairing of the wireless device and the device has been performed, instructions from the wireless device for controlling operation of a furnace or air conditioner of a home in which the device is installed; and
    wherein the mechanism of the device is configured to detect movement of the device after the pairing of the wireless device and the device has been performed.

2. The device of claim 1, wherein the device includes an interface configured to communicate with the wireless device during the pairing of the wireless device and the device.

3. The device of claim 2, wherein the interface is a wireless link that uses a wireless communication protocol to communicate with the wireless device during the pairing of the wireless device and the device.

4. The device of claim 1, wherein the mechanism is an accelerometer.

5. The device of claim 1, wherein the mechanism is a shock detector.

6. The device of claim 1, wherein the processor is configured to execute the instructions to perform the pairing of the wireless device and the device by establishing a link between the wireless device and the device over which the wireless device and device communicate.

7. A method of operating a device, comprising:
    determining, by a device, whether a user of the device is in physical control of both the device and a wireless device during a pairing of the wireless device and the device based only upon whether physical contact is detected between the device and the wireless device simultaneously by the device and a mechanism of the wireless device, wherein the physical contact includes a tap of the device with the wireless device and wherein the mechanism of the wireless device is an accelerometer;
    performing, by the device, the pairing of the wireless device and the device only upon determining the user of the device is in physical control of both the device and the wireless device;
    preventing, by the device, the pairing of the wireless device and the device upon determining the user of the device is not in physical control of both the device and the wireless device;
    receiving, by the device after the pairing of the wireless device and the device has been performed, instructions from the wireless device for controlling operation of a furnace or air conditioner of a home in which the device is installed; and
    detecting, by the device after the pairing of the wireless device and the device has been performed, movement of the device.

8. The method of claim 7, wherein the method includes determining whether the user of the device is in physical control of both the device and the wireless device using an accelerometer of the device.

9. The method of claim 7, wherein the method includes determining whether the user of the device is in physical control of both the device and the wireless device using a shock detector of the device.

10. A system, comprising:
    a wireless device; and
    a device;
    wherein the wireless device includes a mechanism configured to detect physical contact between the device and the wireless device, wherein the mechanism of the wireless device is a shock detector; and
    wherein the device is configured to:
        communicate with the wireless device during a pairing of the wireless device and the device;
        detect the physical contact between the device and the wireless device, wherein the physical contact includes a tap of the device with the wireless device;
        perform the pairing of the wireless device and the device only upon the device and the mechanism of the wireless device simultaneously detecting the physical contact between the device and the wireless device;
        receive, after the pairing of the wireless device and the device has been performed, instructions from the wireless device for controlling operation of a furnace or air conditioner of a home in which the device is installed; and
        detect, after the paring of the wireless device and the device has been performed, movement of the device.

11. The system of claim 10, wherein:
    the device is an energy management device; and
    the wireless device is a mobile phone.

12. The system of claim 10, wherein:
    the device is an energy management device; and
    the wireless device is a sensor.

13. The system of claim 10, wherein the device is configured to detect the physical contact between the device and the wireless device while the device is stationary.

14. The system of claim 10, wherein the device is configured to detect the physical contact between the device and the wireless device while both the device and the wireless device are in motion.

* * * * *